(12) United States Patent  
Park et al.

(10) Patent No.: US 8,155,720 B2  
(45) Date of Patent: Apr. 10, 2012

(54) MOBILE COMMUNICATION DEVICE

(75) Inventors: Sang-Chun Park, Suwon-si (KR); Hong-Bae Kim, Yongin-si (KR); Jong-Kwon Ko, Suwon-si (KR); Byoung-Soo Lee, Yongin-si (KR); Yong-Hyeok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 521 days.

(21) Appl. No.: 12/341,911

(22) Filed: Dec. 22, 2008

(65) Prior Publication Data

US 2009/0176543 A1    Jul. 9, 2009

(30) Foreign Application Priority Data

Jan. 8, 2008    (KR) .................. 10-2008-0002182

(51) Int. Cl.  
*H04M 1/00* (2006.01)

(52) U.S. Cl. ................. 455/575.4; 361/679.56

(58) Field of Classification Search .............. 455/575; 361/679  
See application file for complete search history.

(56) References Cited

U.S. PATENT DOCUMENTS

| 2005/0095995 | A1* | 5/2005 | Bae ......................... 455/90.3 |
| 2007/0032278 | A1* | 2/2007 | Lee et al. ................ 455/575.4 |
| 2008/0058039 | A1* | 3/2008 | Lee et al. ................ 455/575.4 |
| 2008/0194304 | A1* | 8/2008 | Satoshi et al. ........... 455/575.4 |
| 2009/0168339 | A1* | 7/2009 | Lee ......................... 361/679.56 |
| 2009/0247248 | A1* | 10/2009 | Ito .......................... 455/575.4 |

* cited by examiner

*Primary Examiner* — Kent Chang  
*Assistant Examiner* — Kashif Siddiqui  
(74) *Attorney, Agent, or Firm* — H.C. Park & Associates, PLC (57) ABSTRACT

A mobile communication device includes a first plate, and a second plate provided with guide rails on respective edges thereof and slidably coupled to the first plate. A main body is coupled to the first plate and a sub body is coupled to the second plate. Torsion springs are provided on the first plate, adjacent to respective edges of the first plate. Contact members are respectively provided at one end of each torsion spring and each contact member contacts a corresponding guide rail due to elasticity of the torsion spring. Guide slits are disposed in the first plate, adjacent to respective edges of the first plate. Each guide slit receives a corresponding contact member.

13 Claims, 11 Drawing Sheets

MOBILE COMMUNICATION DEVICE

CROSS REFERENCE TO RELATED APPLICATION

This application claims priority from and the benefit of Korean Patent Application No. 10-2008-0002182, filed on Jan. 8, 2008, which is hereby incorporated by reference for all purposes as if fully set forth herein.

BACKGROUND OF THE INVENTION

1. Field of the Invention

The present invention relates to a mobile communication device, and more particularly, to a mobile communication device having a liquid crystal display (LCD) screen on a sub body, which may slide to open or close a main body.

2. Discussion of the Background

A mobile communication device may be classified according to its physical appearance and operational method as a flip type, a folder type, or a slide type.

In a flip type, an LCD screen and keypad are generally installed on the main body and a cover is coupled with the main body by a hinge. The cover may protect the keypad and the main body from being damaged and also may prevent accidental operations.

In the folder type, a sub body (folder) is connected to the main body by a hinge.

In the slide type, a first plate (moving plate) is attached to a sub body, and a second plate (fixed plate) is attached to a main body equipped with the keypad. The sub body may open or close the main body when the first plate slides upward/downward (backward/forward) along the second plate.

Figure 1:
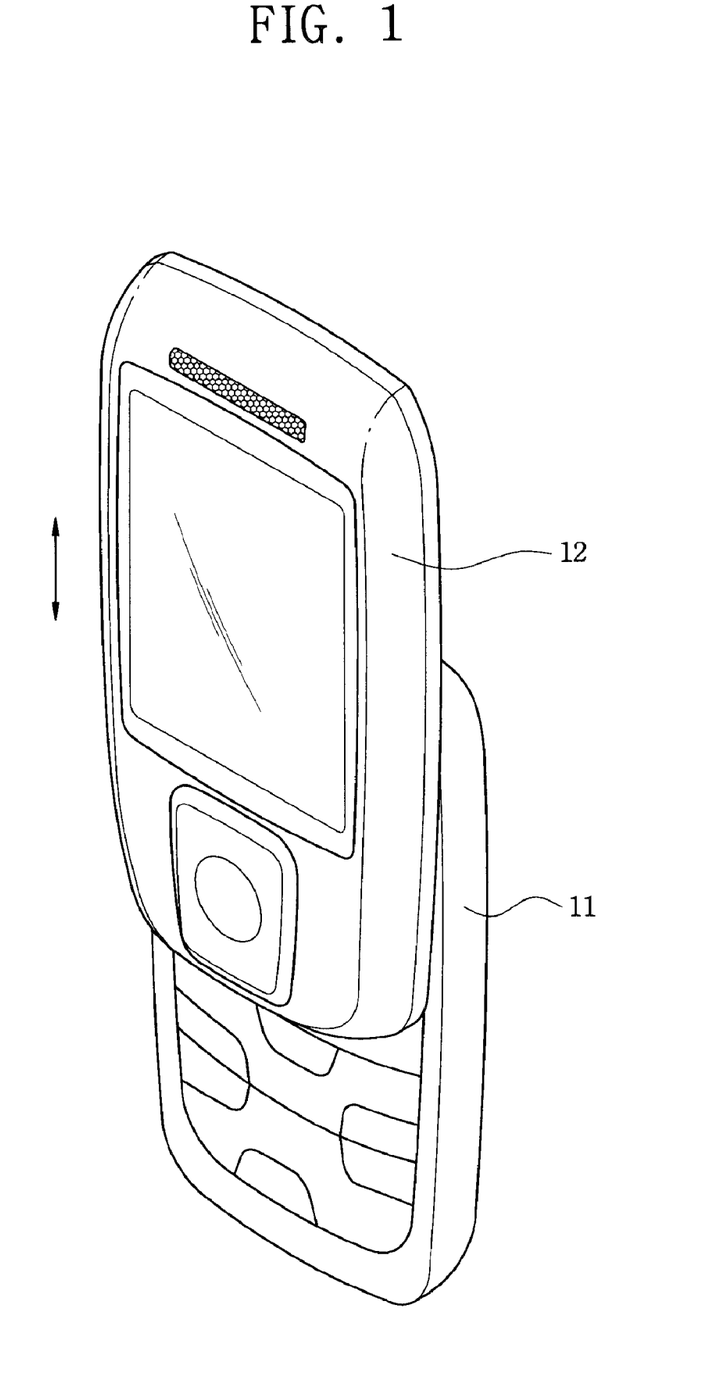
FIG. 1 is a perspective view of a conventional mobile communication device.
Figure 2:
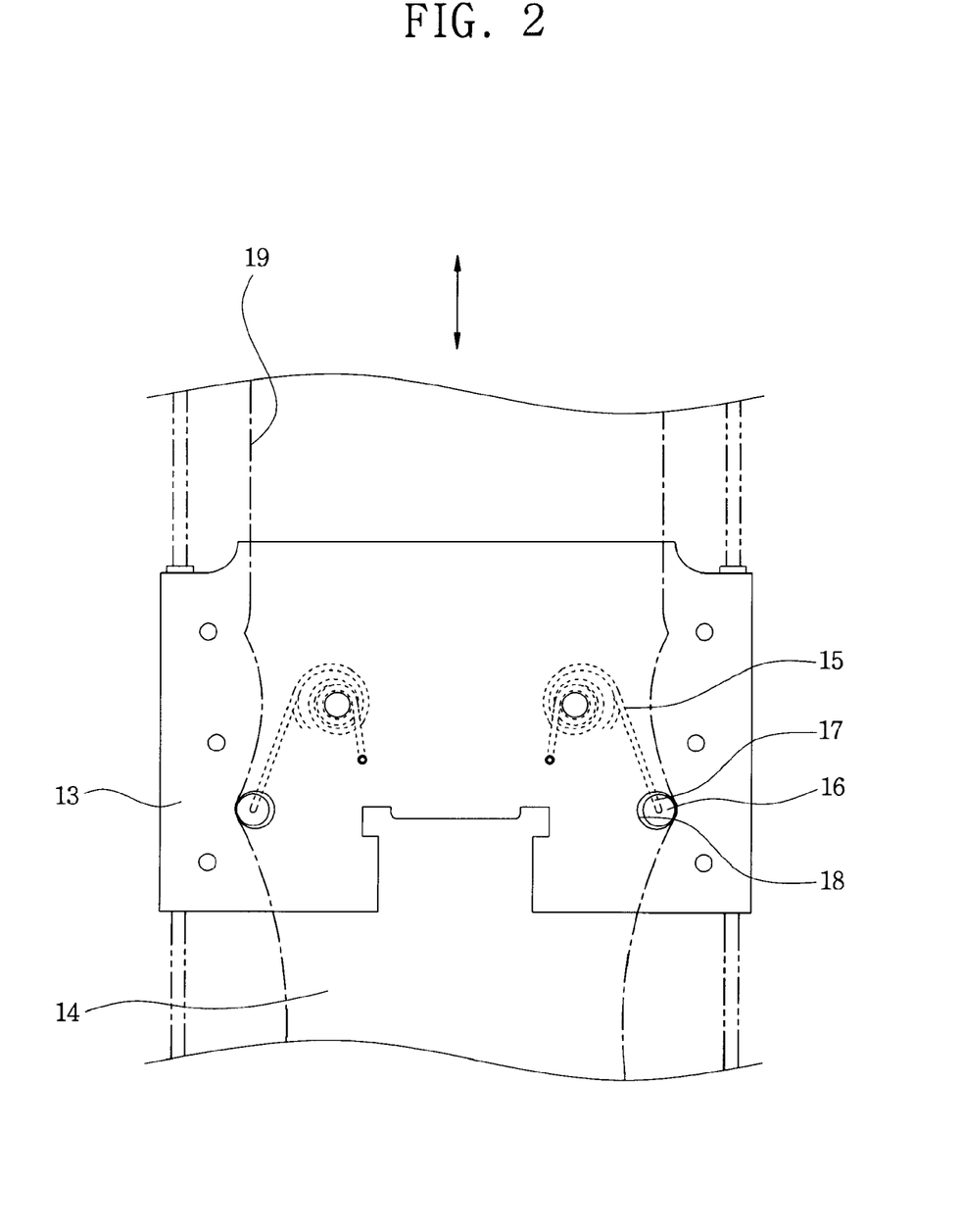
FIG. 2 is a plan view in which the second plate of FIG. 1 slides up and down along a first plate.

FIG. 1 is a perspective view of a conventional mobile communication device, and FIG. 2 is a plan view in which a second plate of FIG. 1 is sliding along the first plate.

Referring to FIG. 1 and FIG. 2, the conventional mobile communication device includes a main body 11, which is equipped with a keypad and has various circuit components inside, and a sub body 12 that slides on the main body.

A first plate 13 is fixed on the main body 11, and a second plate 14 is fixed on the sub body 12.

The second plate 14 is coupled to enable the sliding movement on the first plate 13.

Torsion springs 15 are riveted to sides of the first plate 13 that are adjacent to edges of the first plate 13, respectively.

One end of the torsion spring 15 is inserted into a connection hole 17 of respective moldings 16 (in the form of track rollers), and the moldings 16 are inserted into insertion holes 18, respectively.

Guide rails 19, which the moldings 16 contact, are formed longitudinally along the second plate 14.

In the conventional mobile communication device, the second plate 14 fixed on the sub body 12 slides in the arrow direction when a user pushes the sub body 12 in the arrow direction. The moldings 16 contact the guide rails 19 due to elasticity of the torsion spring 15, and as a result, the second plate 14 may slide smoothly.

The conventional mobile communication device, however, may have a difficult assembly process and weak durability when an end of the torsion spring 15 is inserted into the connection hole 17 of the molding 16.

Moreover, foreign bodies may get stuck or collect on the guide rails 19 over time, which may interrupt the sliding movement of the molding 16 along the guide rails 19, thereby preventing the second plate 14 from sliding. Consequently, it may not be possible to open/close the main body 11.

SUMMARY OF THE INVENTION

The present invention provides a mobile communication device in which a sub body may smoothly slide to open and close a main body even if foreign bodies get stuck or collect on the guide rail of the second plate.

The present invention also provides a mobile communication device having an improved torsion spring, a simplified assembly procedure, and reduced production costs.

Additional features of the invention will be set forth in the description which follows, and in part will be apparent from the description, or may be learned by practice of the invention.

The present invention discloses a mobile communication device including a first plate, a main body coupled to the first plate, a second plate provided with guide rails on respective edges thereof and slidably coupled to the first plate, a sub body coupled to the second plate, torsion springs provided on the first plate, adjacent to respective edges of the first plate, contact members respectively provided at one end of each torsion spring, and guide slits. Each contact member contacts a corresponding guide rail, and each guide slit is disposed in the first plate adjacent to respective edges of the first plate and receives a corresponding contact member.

The present invention discloses a mobile communication device including a first plate, a main body is coupled to the first plate, a second plate provided with guide rails on respective edges thereof and slidably coupled to the first plate, a sub body coupled to the second plate, a double-stepped torsion spring provided in the center of the first plate, contact members respectively provided at each end of the torsion spring and contacting a corresponding guide rail due to elasticity of the torsion spring, and guide slits disposed in the first plate, adjacent to respective edges of the first plate. Each guide slit receives a corresponding contact member.

The present invention also discloses a mobile communication device including a first plate, a main body coupled to the first plate, a second plate provided with guide rails on respective edges thereof and slidably coupled to the first plate, a sub body coupled to the second plate, a double-stepped torsion spring disposed on the center of the first plate, contact members disposed at each end of the torsion spring and contacting a corresponding guide rail due to elasticity of the torsion spring and guide slits disposed in the first plate, adjacent to both edges of the first plate. Each guide slit receives a corresponding contact member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 3:
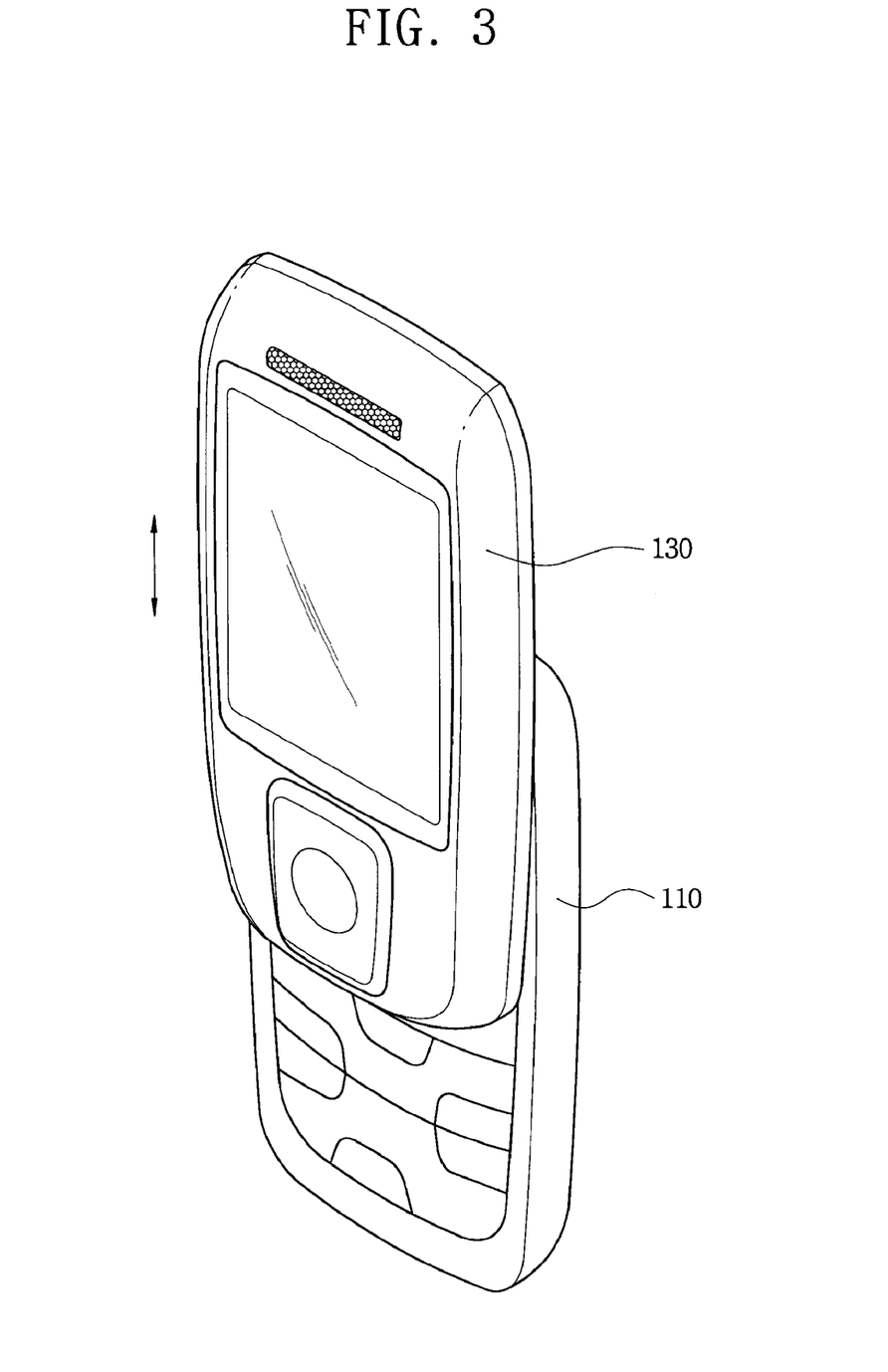
FIG. 3 is a perspective view of a mobile communication device according to a first exemplary embodiment of the invention.
Figure 4:
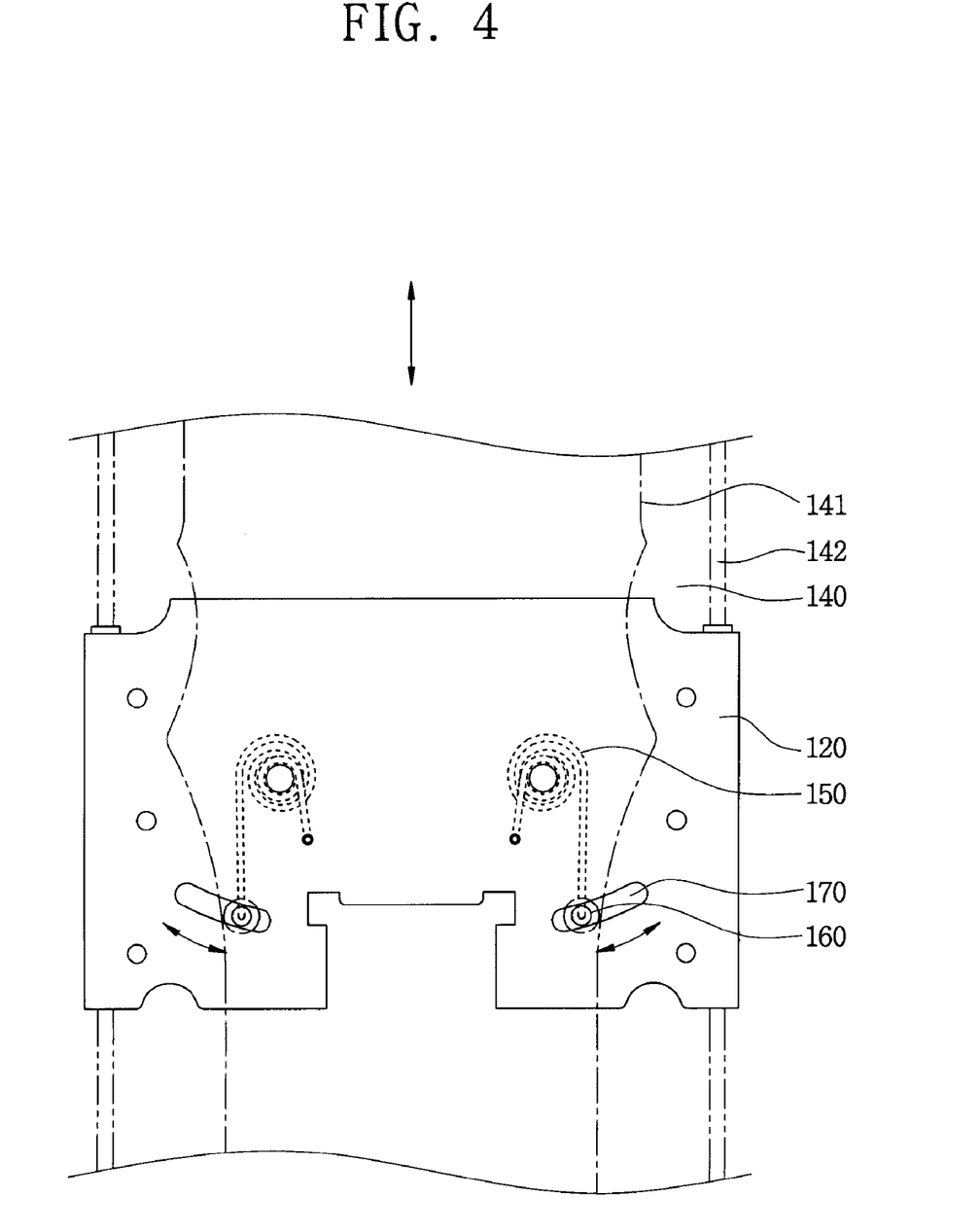
FIG. 4 and FIG. 5 are plan views in which the second plate slides on a first plate.
Figure 5:
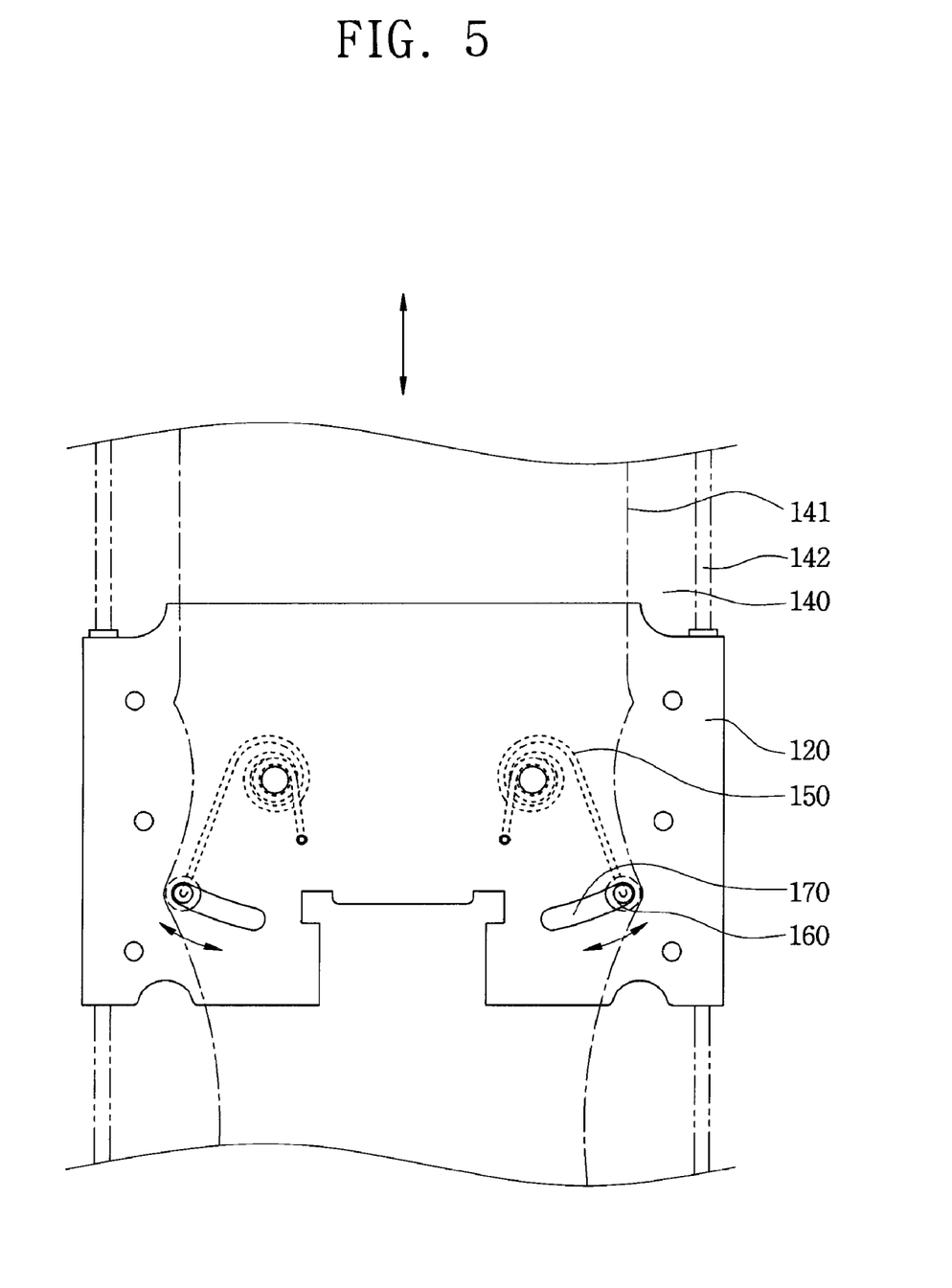
Figure 6:
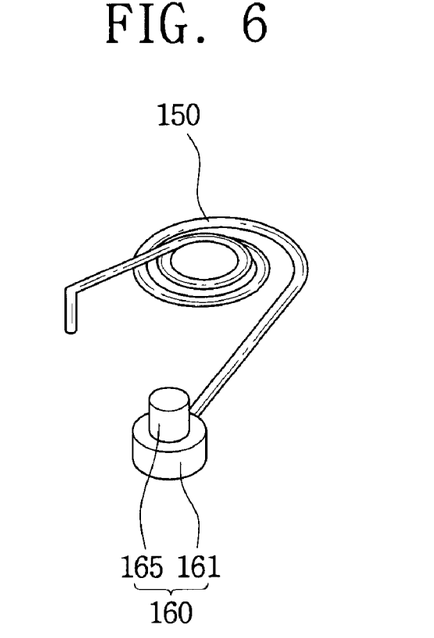
FIG. 6 is a perspective view of the torsion spring and the contact member of FIG. 3.
Figure 7:
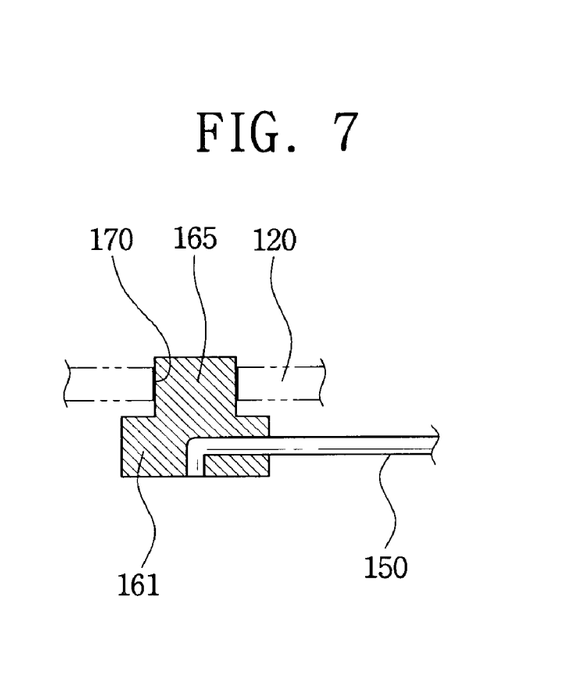
FIG. 7 is a cross-sectional view of the contact member of FIG. 3.

FIG. 3 is a perspective view of a mobile communication device according to the first exemplary embodiment of the invention and FIG. 4 and FIG. 5 are plan views in which a second plate slides on a first plate. FIG. 6 is a perspective view of a torsion spring and a contact member, and FIG. 7 is a cross-sectional view of a contact member of FIG. 3.

Referring to FIG. 3, FIG. 4, FIG. 5, FIG. 6, and FIG. 7, the mobile communication device, according to the first exemplary embodiment of the invention, includes a first plate 120, a main body 110 fixed to the first plate 120, a second plate 140 slidably coupled to the first plate 120 and provided with guide rails 141 on both edges of one side thereof, a sub body 130 fixed to the second plate 140, torsion springs 150 provided on one side of the first plate 120, adjacent to respective edges of the first plate 120, contact members 160 (in the form of a track roller) respectively provided at one end of each torsion spring 150, and guide slits 170 to receive a corresponding contact member 160. Each contact member 160 contacts a corresponding guide rail 141 due to elasticity of the torsion spring 150, and the guide slits 170 are formed in the first plate 120 adjacent to respective edges of the first plate 120 to guide the movement of the contact member 160.

An input keypad and various circuit components may be installed inside the main body 110. The first plate 120 is fixed to the main body 110.

The sub body 130 includes a liquid crystal display (LCD) screen, and the second plate 140 is fixed to the sub body 130.

The second plate 140 is installed above the first plate 120 with a gap therebetween and respective edges of the first plate 120 are coupled to slide bars 142 of the second plate 140.

Referring to the above-mentioned figures, the second plate 140 may slide in the longitudinal direction (in the arrow direction), and the sub body 130, which is fixed to the second plate 140, may open or close the main body 110.

Each torsion spring 150 is riveted on the first plate 120 and adjacent to an edge of the first plate 120, and the corresponding contact member 160, which is provided at one end of the torsion spring 150, may be formed by insert molding.

The contact member 160 may include a cylindrical body 161 contacting the guide rail 141, and a cylindrical shaft 165 extending from the center of the cylindrical body 161 and inserted into the guide slit 170.

The contact member 160 may be made from durable materials like plastic substances or aluminum.

Since the cylindrical body 161 contacts the guide rail 141, the cylindrical body 161 should have a smooth surface to provide for smooth sliding of the second plate 140.

The cylindrical shaft 165 is inserted into the guide slit 170 and may stick out of the guide slit 170 as long as it is not extracted from the guide slit 170 when the second plate 140 slides.

In the first exemplary embodiment of the present invention, when a user pushes the sub body 130 upward or downward in the arrow direction, the second plate 140 fixed on the sub body 130 slides in the arrow direction. The cylindrical body 161 of each contact member 160 contacts the corresponding guide rail 141 due to elasticity of the corresponding torsion spring 150, and the sub body 130 may smoothly open or close the main body 110.

Although foreign bodies may get stuck and collect on the guide rails 141 over time, the sub body 130 may smoothly open or close the main body 110 because the contact member 160 may move backward in the arrow direction when the sub body 130 slides.

The torsion spring 150 and the contact member 160 may be integrally formed since the contact member 160 may be formed on the torsion spring 150 by insert molding. As a result, the assembly process may be easy and the durability may be much improved.

Figure 8:
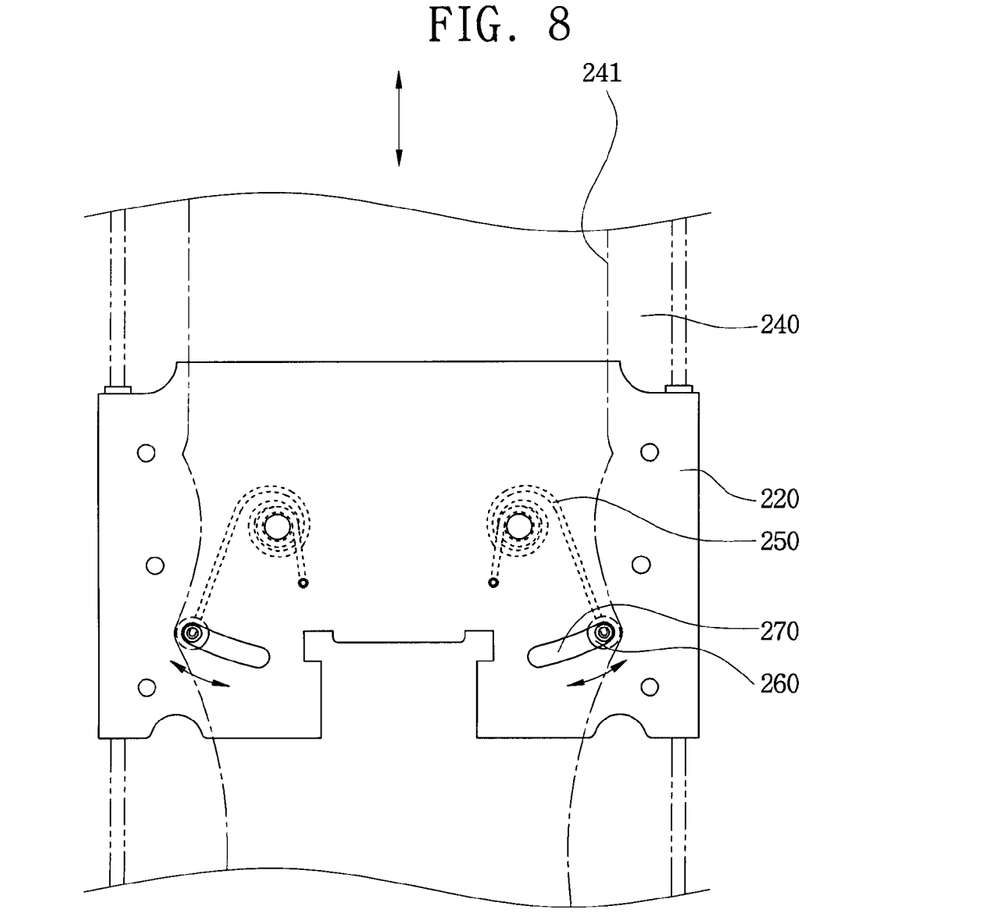
FIG. 8 is a plan view of a mobile communication device according to a second exemplary embodiment of the invention, in which a second plate slides along a first plate.
Figure 9:
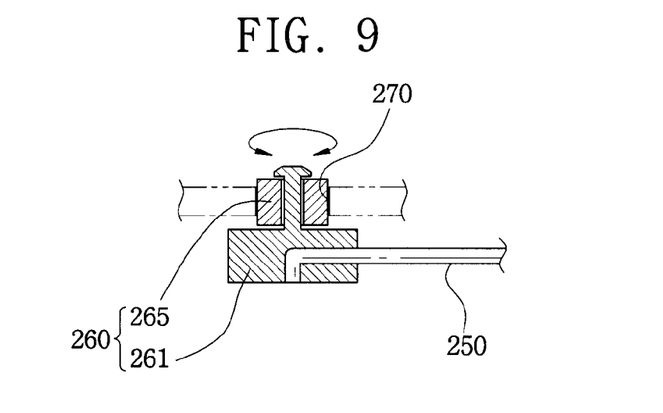
FIG. 9 is a cross-sectional view of the contact member of FIG. 8.

FIG. 8 is a plan view of a mobile communication device according to a second exemplary embodiment of the invention, in which a second plate slides along a first plate, and FIG. 9 is a cross-sectional view of the contact member of FIG. 8.

Referring to FIG. 8 and FIG. 9, the mobile communication device according to the second exemplary embodiment, includes a first plate 220, a main body 110 fixed to the first plate 220, a second plate 240 provided with guide rails 241 adjacent to both edges of one side thereof and slidably coupled to the first plate 220, a sub body 130 fixed to the second plate 240, torsion springs 250 provided on one side of the first plate 220, adjacent to respective edges of the first plate 220, contact members 260 respectively provided at one end of each torsion spring 250 and contacting a corresponding guide rail 241 due to elasticity of the corresponding torsion spring 250, and guide slits 270 formed in the first plate 220. The contact members 260 are inserted into the respective guide slits 270, which are adjacent to respective edges of the first plate 220, to provide for smooth movement of the contact member 260. The contact member 260 may include a cylindrical body 261 having a top shaft and contacting the guide rail 241, and a cylindrical roller 265 extending from the top shaft of the cylindrical body 261 and rotatably inserted into the guide slit 270.

The mobile communication device according to the second exemplary embodiment of the invention is characterized by the cylindrical roller 265 of the contact member 260 being inserted rotatably in the guide slit 270.

The cylindrical roller 265 of the contact member 260 may be inserted in the guide slit 270 and may have a smooth surface to provide for smooth sliding of the second plate 240. The cylindrical roller 265 of the contact member 260 may stick out of the guide slit 270 as long as it is not extracted from the guide slit 270.

When a user pushes the sub body 130 upward or downward in the arrow direction, the second plate 240 fixed on the sub body 130 slides in the arrow direction. The cylindrical body 261 of the contact member 260 contacts the guide rail 241 due to the elasticity of the torsion spring 250 and the sub body 130 may smoothly slide to open or close main body 110.

Although foreign bodies may get stuck and collect on the guide rail 241 over time, the sub body 130 may slide smoothly because the contact member 260 may move backward in the arrow direction when the sub body 130 slides. The cylindrical roller 265 can rotate inside the guide slit 270 and so the sub body 130 may open or close the main body 110 more smoothly.

The contact member 260 and the torsion spring 250 may be made integrally formed since the contact member 260 may be formed on the torsion spring 250 by insert molding. As a result, the assembly process may be easier and the durability may be much improved.

Figure 10:
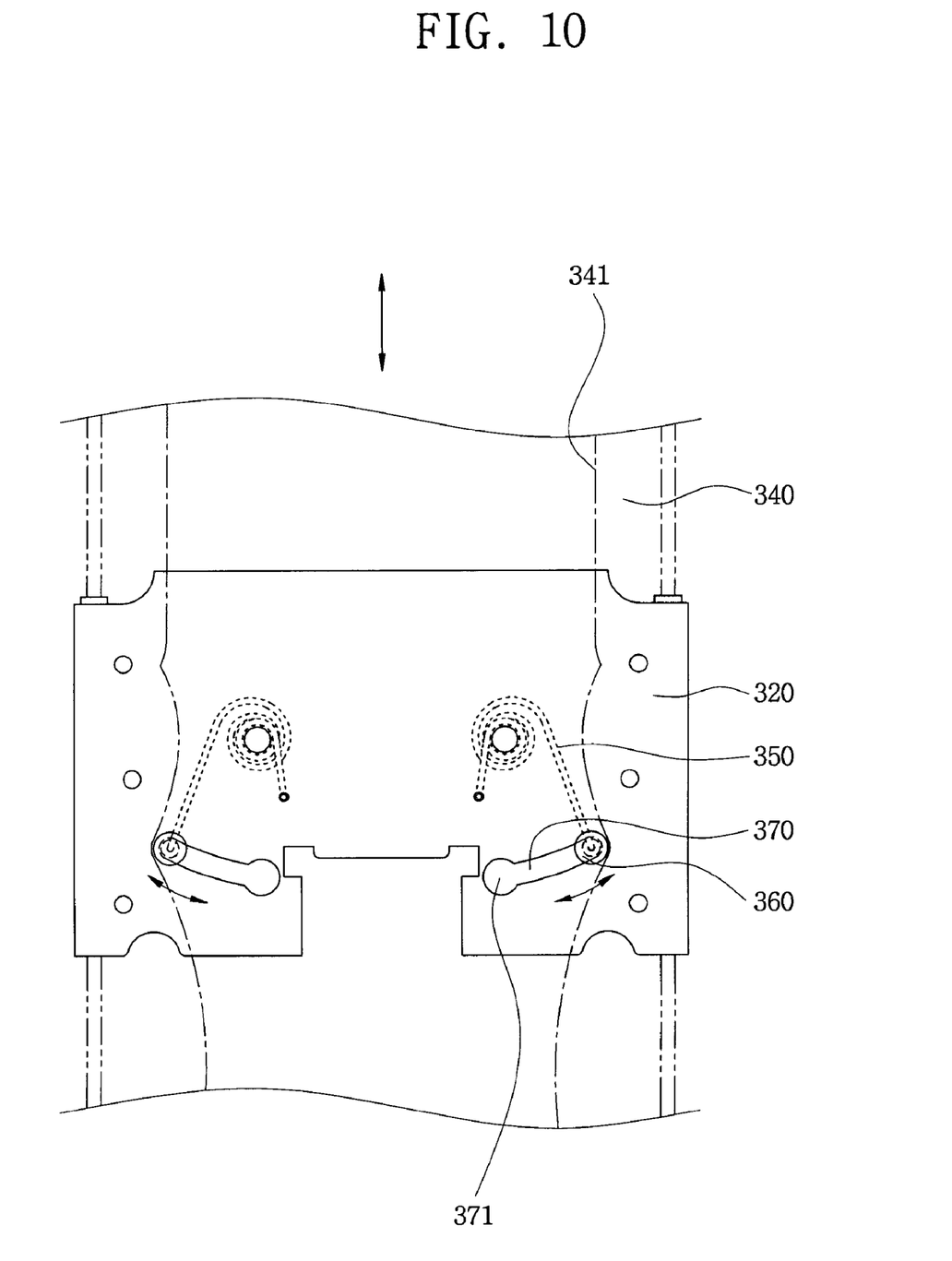
FIG. 10 is a plan view of a mobile communication device according to a third exemplary embodiment of the invention, in which a second plate slides along a first plate.
Figure 11:
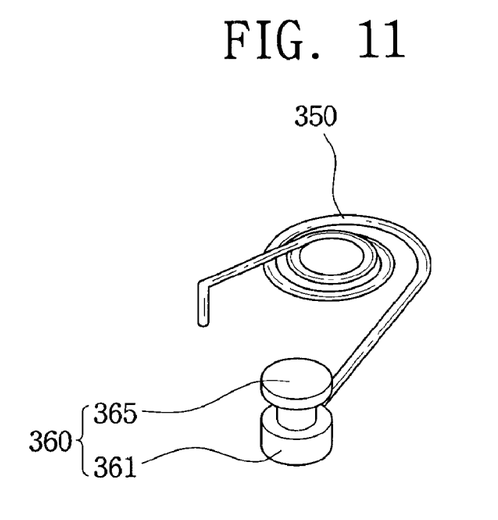
FIG. 11 is a perspective view of a contact member of FIG. 10.

FIG. 10 is a plan view of a mobile communication device according to a third exemplary embodiment of the invention, wherein a second plate slides along a first plate. FIG. 11 is a perspective view of a contact member of FIG. 10, and FIG. 12 is a cross-sectional view of a contact member of FIG. 10.

Figure 12:
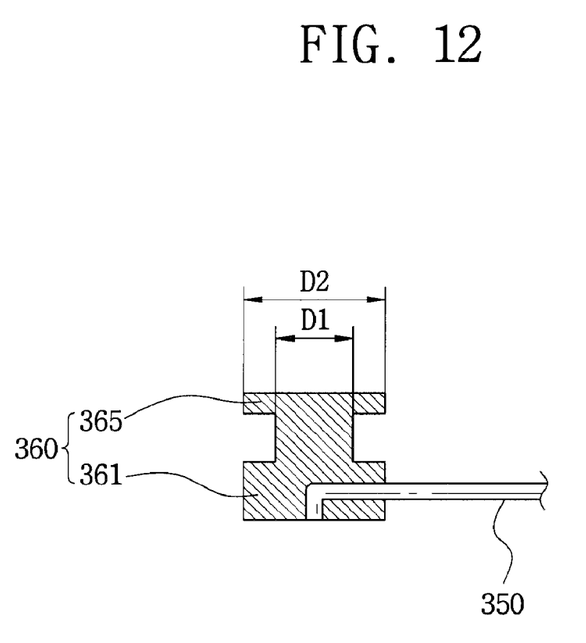
FIG. 12 is a cross-sectional view of a contact member of FIG. 10.

Referring to FIG. 10, FIG. 11, and FIG. 12, the mobile communication device according to the third exemplary embodiment includes a first plate 320, a main body 110 fixed on the first plate 320, a second plate 340 provided with guide rails 341 on both edges of one side and slidably coupled to the first plate 320, a sub body 130 fixed on the second plate 340, torsion springs 350 provided on one side of the first plate 320, adjacent to the respective edges of the first plate 320, contact members 360 respectively provided at one end of each torsion spring 350 and contacting a corresponding guide rail 341 due to elasticity of the respective torsion spring 350, and guide slits 370. The contact members 360 are inserted into the guide slits 370 formed in the first plate 320 and adjacent to respective edges of the first plate 320, to provide for smooth movement of the contact members 360. The contact member 360 may include a cylindrical body 361 contacting the guide rails 341, and a cylindrical shaft 365 having a wider diameter D2 than the diameter D1 of the guide slit 370 and extending from the center of the cylindrical body 361 and inserted into the guide slit 370.

An in/out-hole 371 may be formed in the guide slit 370 to selectively introduce the cylindrical shaft 365 into the guide slit 370.

The in/out-hole 371 may be placed where the contact member 360 cannot be accidentally extracted from the guide slit 370 while moving along the guide slit 370, for instance at a rear part of the guide slit 370.

According to the third exemplary embodiment of the present invention, when a user pushes the sub body 130 upward or downward in the arrow direction, the second plate 340 fixed on the sub body 130 slides in the arrow direction. The cylindrical body 361 of the contact member 360 contacts the guide rail 341 due to the elasticity of the respective torsion spring 350, and the sub body 130 may smoothly open or close the main body 110.

Although foreign bodies may get stuck and collect on the guide rail 341 from the long-time usage, the sub body 130 may slide smoothly because the contact member 360 may move further backward in the arrow direction when the sub body 130 slides.

Referring to the mobile communication device according to the third exemplary embodiment of the invention, the cylindrical shaft 365 may not be accidentally extracted from the guide slit 370 when the sub body 130 slides. The reason is that the cylindrical shaft 365, having a wider diameter D2 than the diameter D1 of the guide slit 370, is inserted in the guide slit 370.

To insert the cylindrical shaft 365 of the contact member 360 in the guide slit 370, the cylindrical shaft 365 of the contact member 360 may be inserted into the in/out-hole 371 by pressing the end of the torsion spring 350. By releasing the pressed end of the torsion spring 350, the cylindrical shaft 365 may be elastically inserted into the guide slit 370 due to the elasticity of the respective torsion spring 350.

Figure 13:
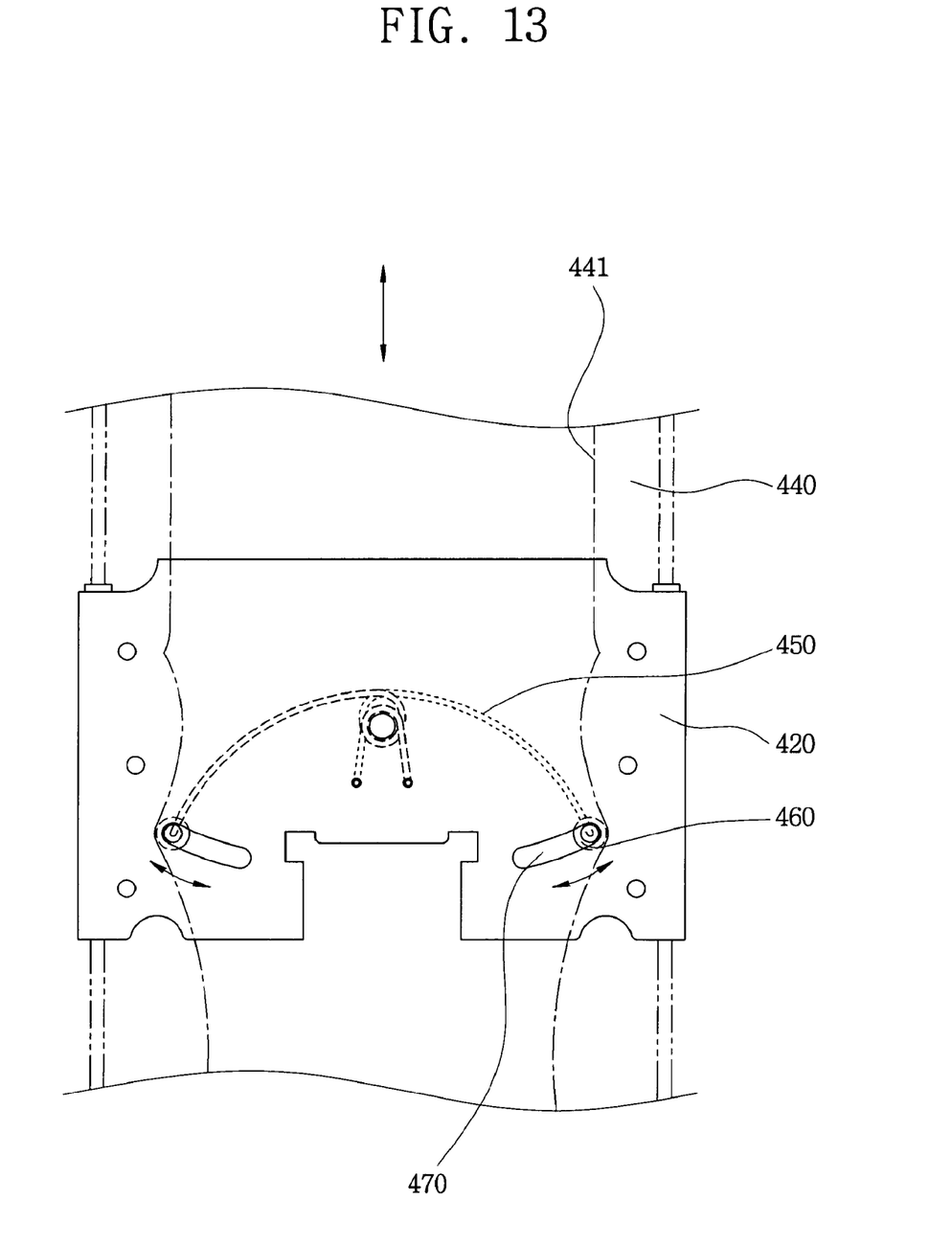
FIG. 13 is a plan view of a mobile communication device according to a fourth exemplary embodiment of the invention, in which a second plate slides along a first plate.

FIG. 13 is a plan view of a mobile communication device according to a fourth exemplary embodiment of the invention in which a second plate slides along a first plate.

Referring to FIG. 13, the mobile communication device, according to the fourth exemplary embodiment, includes a first plate 420, a main body 110 fixed on the first plate 420, a second plate 440 provided with guide rails 441 on respective edges of one side and slidably coupled to the first plate 420, a sub body 130 fixed on the second plate 440, a double-stepped torsion spring 450 provided at the center of the first plate 420, contact members 460 provided at both ends of the double-stepped torsion spring 450 and contacting respectively corresponding guide rails 441 due to elasticity of the double-stepped torsion spring 450, and guide slits 470. The contact members 460 are inserted into respective guide slits 470, which are formed in the first plate 420, adjacent to respective edges of the first plate 420, to guide the movement of the contact member 460.

The double-stepped torsion spring 450 may be riveted on the first plate 420, and the contact members 460 may be formed at the ends of the double-stepped torsion spring 450 by insert molding.

When a user pushes the sub body 130 upward or downward in the arrow direction, the second plate 440 fixed on the sub body 130 slides in the arrow direction. The cylindrical bodies 461 of the contact members 460 contact the guide rails 441 due to the elasticity of the double-stepped torsion spring 450, and the sub body 130 may slide smoothly to open or close the main body 110.

Referring to the mobile communication device according to the fourth exemplary embodiment of the invention, the double-stepped torsion spring 450 is installed at the center of the first plate 420 and whole assembly process may be minimized by eliminating the riveting procedure.

Figure 14:
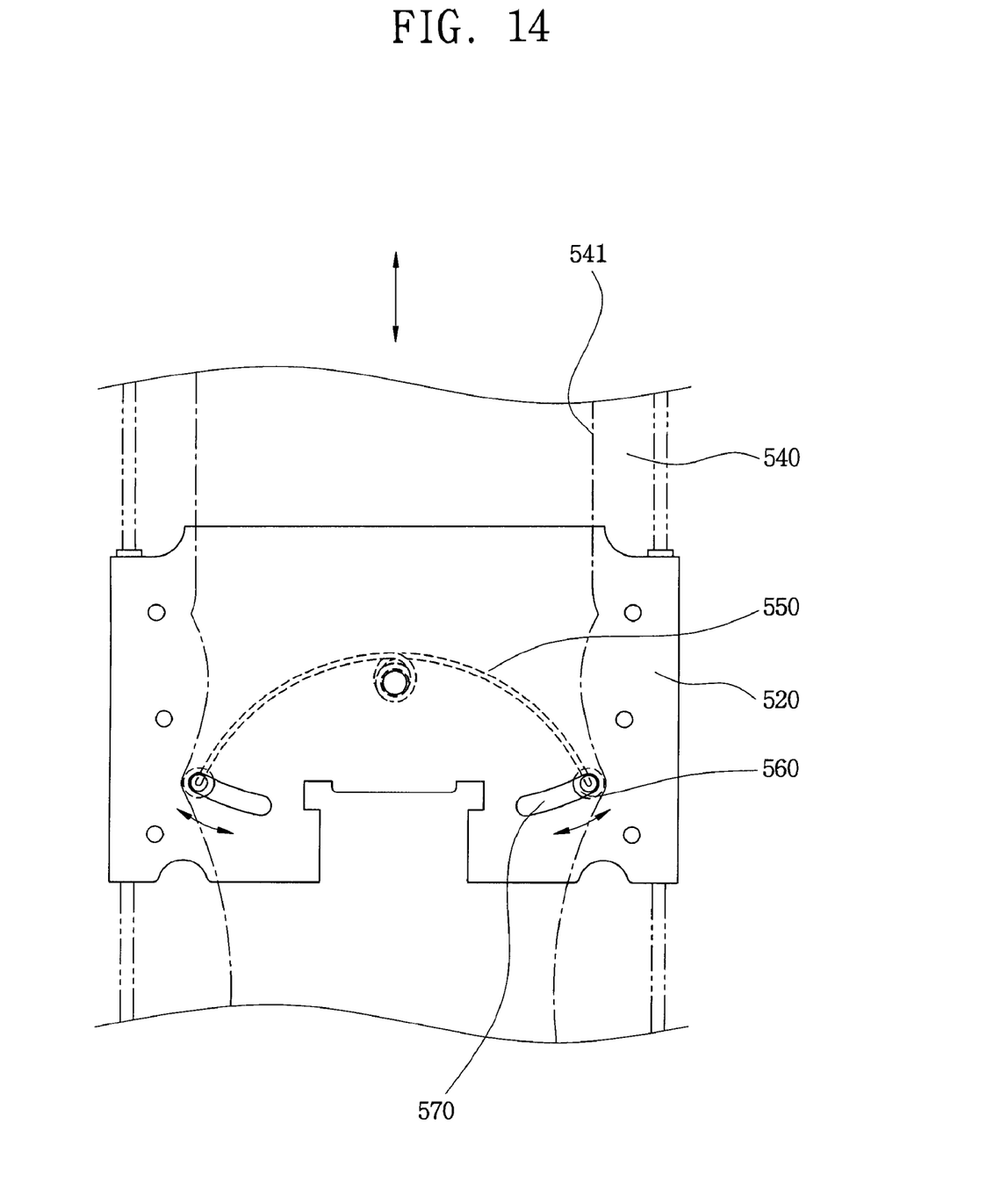
FIG. 14 is a plan view of a mobile communication device according to a fifth exemplary embodiment of the invention, in which a second plate slides along a first plate.

FIG. 14 is a plan view of a mobile communication device according to a fifth exemplary embodiment of the invention, wherein a second plate slides along a first plate.

Referring to FIG. 14, a mobile communication device according to the fifth exemplary embodiment includes a first plate 520, a main body 110 fixed to the first plate 520, a second plate 540 provided with guide rails 541 on both edges of one side and slidably coupled to the first plate 520, a sub body 130 fixed to the second plate 540, a double-stepped torsion spring 550 provided at the center of the first plate 520, contact members 560 provided at respective ends of the double-stepped torsion spring 550 and contacting corresponding guide rails 541 due to elasticity of the double-stepped torsion spring 550, and guide slits 570. The contact members 560 are inserted into respective guide slits 570 formed in the first plate 520, adjacent to respective edges of the first plate 520, to guide the movement of the contact member 560.

The center of the double-stepped torsion spring 550 may be riveted at the center of the first plate 530, and the contact member 560 may be formed on both ends of the double-stepped torsion spring 550 by insert molding.

In the fifth exemplary embodiment of the present invention, when a user pushes the sub body 130 upward or downward in the arrow direction, the second plate 540 fixed on the sub body 130 slides in the arrow direction. The cylindrical body 561 of the contact member 560 contacts the guide rail 541 due to the elasticity of the double-stepped torsion spring 550, and the sub body 130 will slide smoothly to open or close the main body 110.

Referring to the mobile communication device according to the fifth exemplary embodiment of this invention, a double-stepped torsion spring 550 is installed at the center of the first plate 520 and the contact members 560 are formed on both ends of the double-stepped torsion spring 550. As a result, the whole assembly process may be reduced by eliminating the numbers of the torsion springs and riveting procedures.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile communication device, comprising:
   a first plate;
   a second plate provided with guide rails on respective edges of the second plate and slidably coupled to the first plate;
   a main body coupled to the first plate;
   a sub body coupled to the second plate;
   a torsion spring provided on the first plate;
   contact members respectively disposed at one end of each torsion spring and contacting a corresponding guide rail due to elasticity of the torsion spring; and
   guide slits disposed in the first plate, adjacent to respective edges of the first plate, each guide slit to receive a corresponding contact member,
   wherein the guide slits overlap the second plate in response to the first plate being in a first position, and
   wherein the guide slits do not overlap the second plate in response to the first plate being in a second position, the second position being different than the first position.

2. The mobile communication device of claim 1, wherein the torsion spring comprises torsion springs, which are adjacent to the respective edges of the first plate.

3. The mobile communication device of claim 2, wherein each contact member comprises:
   a cylindrical body contacting the guide rail, and
   a cylindrical shaft that extends from a central portion of the cylindrical body and is inserted into the guide slit.

4. The mobile communication device of claim 2, wherein each contact member comprises:
   a cylindrical body contacting the guide rail, and
   a cylindrical roller that extends from a central portion of the cylindrical body and is inserted into the guide slit.

5. The mobile communication device of claim 2, wherein each contact member comprises:
   a cylindrical body contacting the guide rail, and
   a cylindrical shaft that has a wider diameter than the corresponding guide slit, extends from a central portion of the cylindrical body, and is inserted into the guide slit.

6. The mobile communication device of claim 5, wherein an in/out-hole is disposed at a rear of each guide slit to selectively introduce the cylindrical shaft into the guide slit.

7. The mobile communication device of claim 1,
   wherein the torsion spring comprises a double-stepped torsion spring provided at the center of the first plate.

8. The mobile communication device of claim 7, wherein the torsion spring is riveted on the first plate, and the contact members are integrally formed with the torsion spring.

9. The mobile communication device of claim 7, wherein each contact member comprises:
   a cylindrical body contacting the guide rail, and
   a cylindrical shaft extending from a center of the cylindrical body and inserted into the guide slit.

10. The mobile communication device of claim 1,
    wherein the torsion spring comprises a torsion spring disposed at a center of the first plate.

11. The mobile communication device of claim 10, wherein a center of the torsion spring is riveted on the first plate, and the contact members are formed integrally with the torsion spring.

12. The mobile communication device of claim 10, wherein each contact member comprises:
    a cylindrical body contacting the guide rail, and
    a cylindrical shaft extending from a central portion of the cylindrical body and inserted into the guide slit.

13. The mobile communication device of claim 2, wherein the torsion springs are riveted on the first plate, and each contact member is integrally formed with the corresponding torsion spring.

* * * * *